(12) United States Patent
Schnell

(10) Patent No.: US 8,775,566 B2
(45) Date of Patent: Jul. 8, 2014

(54) FILE FORMAT FOR MEDIA DISTRIBUTION AND PRESENTATION

(75) Inventor: Patrik Schnell, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 12/143,768

(22) Filed: Jun. 21, 2008

(65) Prior Publication Data

US 2009/0319563 A1    Dec. 24, 2009

(51) Int. Cl.
*H04N 19/00* (2014.01)
*H04N 7/50* (2006.01)
*H04N 21/44* (2011.01)
*G06F 17/30* (2006.01)

(52) U.S. Cl.
CPC ... *H04N 19/00781* (2013.01); *H04N 21/44016* (2013.01); *G06F 17/30017* (2013.01)
USPC .............................. 709/219; 709/231; 725/32

(58) Field of Classification Search
None
See application file for complete search history.

(56) References Cited

U.S. PATENT DOCUMENTS

| | | | |
|---|---|---|---|
| 6,594,699 B1 * | 7/2003 | Sahai et al. | 709/228 |
| 6,792,047 B1 * | 9/2004 | Bixby et al. | 375/240.26 |
| 6,909,743 B1 * | 6/2005 | Ward et al. | 375/240.01 |
| 7,007,295 B1 | 2/2006 | Rose et al. | |
| 7,039,116 B1 * | 5/2006 | Zhang et al. | 375/240.26 |
| 7,096,488 B1 * | 8/2006 | Zhang et al. | 725/105 |
| 7,277,958 B2 | 10/2007 | Chung et al. | |
| 7,315,899 B2 | 1/2008 | Dunning et al. | |
| 7,669,121 B2 * | 2/2010 | Kiilerich | 715/249 |
| 8,131,875 B1 * | 3/2012 | Chen et al. | 709/246 |
| 2002/0069218 A1 * | 6/2002 | Sull et al. | 707/501.1 |
| 2002/0104101 A1 * | 8/2002 | Yamato et al. | 725/139 |
| 2002/0107973 A1 * | 8/2002 | Lennon et al. | 709/231 |
| 2003/0018609 A1 * | 1/2003 | Phillips et al. | 707/1 |
| 2003/0167337 A1 | 9/2003 | Liew et al. | |
| 2003/0208469 A1 * | 11/2003 | Stern | 707/1 |
| 2004/0078353 A1 * | 4/2004 | Brock et al. | 707/1 |
| 2004/0255236 A1 * | 12/2004 | Collart | 715/500.1 |
| 2005/0038637 A1 * | 2/2005 | Balakrishnan et al. | 703/2 |
| 2005/0069287 A1 | 3/2005 | Suh | |

(Continued)

OTHER PUBLICATIONS

Walpole, J., et al., "A Player for Adaptive MPEG Video Streaming Over the Internet," In Proceedings 26th Applied Imagery Pattern Recognition Workshop AIPR-97, SPIE, 1997.*

(Continued)

*Primary Examiner* — Polina Peach
(74) *Attorney, Agent, or Firm* — Micah Goldsmith; Glen Johnson; Micky Minhas

(57) ABSTRACT

A file format supports distribution, presentation, and storage of media presentations ("MPs"). A sequence of a MP is composed of segments of media data referred to by segmentIDs. Segments are defined as movie fragments, pursuant to the "ISO base media file format". Multiple instances of a segment, each having a unique instanceID, are created by encoding the media data based on different encoding characteristics, referred to as encodingIDs. A sequence map box ("SMB") stores the arrangement of a sequence's segmentIDs-to-instanceIDs, including encodingIDs. The SMB is distributed to a client-side media processing unit ("MPU"). Information regarding an instance selected for distribution to the MPU is encapsulated in an instance identifier box ("IIB"), along with the arrangement of instanceIDs for the segment, and distributed to the MPU. At the time of distribution and/or playback of the MP, the MPU interchange instances based on the contents of the SMB and/or the IIB.

20 Claims, 7 Drawing Sheets

(56) References Cited

U.S. PATENT DOCUMENTS

| | | | |
|---|---|---|---|
| 2005/0262265 A1 | 11/2005 | Ohtsuka | |
| 2006/0062478 A1* | 3/2006 | Cetin et al. | 382/232 |
| 2006/0129909 A1* | 6/2006 | Butt et al. | 715/500.1 |
| 2006/0174160 A1 | 8/2006 | Kim | |
| 2007/0088844 A1 | 4/2007 | Seims | |
| 2007/0150462 A1* | 6/2007 | Nonaka et al. | 707/5 |
| 2007/0168542 A1* | 7/2007 | Gupta et al. | 709/231 |
| 2007/0186005 A1 | 8/2007 | Setlur et al. | |
| 2007/0204311 A1* | 8/2007 | Hasek et al. | 725/91 |
| 2007/0283035 A1 | 12/2007 | Wang | |
| 2008/0155627 A1* | 6/2008 | O'Connor et al. | 725/109 |
| 2008/0207182 A1* | 8/2008 | Maharajh et al. | 455/414.1 |
| 2009/0063280 A1* | 3/2009 | Wurster et al. | 705/14 |
| 2009/0150557 A1* | 6/2009 | Wormley et al. | 709/231 |

OTHER PUBLICATIONS

"Media Streaming & Download Delivery Solution" http://www.access-company.com/products/netfrontmobile/endtoend/streaming.html.

"Providing Digital Media Files for Downloading, Streaming, or Both", 1 Pages http://msdn2.microsoft.com/en-us/library/bb614752.aspx.

"SDP MultiMedia", Date: Jan. 2001, 3 Pages, Publisher: SDP Multimedia http://sdp.ppona.com/.

Shan, et al., "Hybrid video downloading/streaming over peer-to-peer networks", Multimedia and Expo, 2003. ICME apos;03. Proceedings. 2003 International Conference, Date: Jul. 6-9, 2003, pp. II-665-668, vol. 2.

* cited by examiner

FILE FORMAT FOR MEDIA DISTRIBUTION AND PRESENTATION

BACKGROUND

Media presentations are generally composed of media content such as video, audio, images, text, and/or graphics. Many synchronous and asynchronous distribution techniques are used to deliver media presentations to users of client-side media processing units, including but not limited to streaming (on-demand or live), downloading, and file sharing. Most media distribution services, however, support a limited variety of distribution techniques.

With the availability of virtually ubiquitous networking opportunities and fresh media presentations, there has been increasing consumer demand for media processing units, which may have limited processing, memory, access to limited connectivity resources, and/or fluctuating access to resources accessed by the media presentation. Despite the relatively non-uniform environments in which media processing units operate, consumers generally expect quick, predictable and glitch-free distribution, streaming presentation, and playback from storage of media presentations.

Flexible media file formats that are usable with a variety of distribution techniques to support the efficient use of limited media processing and/or network resources are desirable.

SUMMARY

The file format described herein provides a common format for different distribution and/or presentation techniques, and helps to ensure that a user of a client-side media processing unit experiences fewer glitches (for example, delays, undesirable interruptions, or dropped content) in the presentation of a media presentation, even in situations in which resources such as network bandwidth and/or media processing resources are limited, when conditions result in fluctuations in resource availability, and/or when different client-side media processing units receive and/or play back the media presentation.

A media presentation is composed of one or more sequences of media data such as video, audio, images, text, and/or graphics, which are distributed, stored and/or rendered by one or more types of media processing units. A particular sequence of media data is arranged into a number of segments, each of which is independently distributed and stored. A particular segment includes a predetermined amount of encoded media data, usually an amount of media data that is presentable within a certain amount of time, although other arrangements are possible. A file format specifies, among other things, the time-ordered segments of which particular sequences of a media presentation are composed, along with metadata regarding the media presentation.

In accordance with the file format described herein, a segment of a particular sequence of a media presentation is defined as a movie fragment. Movie fragments are data structures specified by the "ISO base media file format" established by the International Organization for Standardization ("ISO.")) For discussion purposes, a particular sequence is referred to as having a particular "sequenceID," and a particular segment is referred to as having a particular "segmentID." A particular segment has multiple instances, each of which is created by encoding the media data represented by the particular segment based on different characteristics, including but not limited to: encoding formats; codec types; encoding rates; languages; compression ratios; and encryption formats. Each instance of a particular segment shares the same sequence ID and segmentID, and is identified by a unique instance identifier, referred to for discussion purposes as an "instanceID." In a particular sequence, segmentIDs having the same encoding characteristics can be identified via an identifier referred to discussion purposes as an "encodingID."

A logical arrangement of segmentIDs-to-instanceIDs for a particular sequenceID, along with metadata such as information about encoding characteristics (encodingIDs, for example) and storage locations for copies of each instance, is generated and stored in a sub-box of a box specified by the ISO media file format. For discussion purposes, the sub-box is referred to as the "sequence map box."

In connection with distribution of a particular sequence of a media presentation to a server- or client-side media processing unit, the sequence map box (or a reference thereto) is transmitted to the media processing unit. The media processing unit evaluates certain instance selection criteria, including but not limited to criteria based on characteristics of the media processing unit (available computing resources, for example) and/or criteria based on characteristics of the distribution network (for example, available bandwidth, speed, usage, cost, and the like), to select, via the sequence map box, the particular instance of a particular segment that is to be requested for distribution to a client-side media processing unit.

The requested instance is encapsulated in a media data box, which is specified by the ISO media file format. Within a movie fragment box associated with the media data box is stored a sub-box referred to herein for exemplary purposes as the "instance identifier box." The instance identifier box encapsulates metadata regarding the requested instance (such as instanceID and/or encodingID), and also references the logical arrangement of instanceIDs for a particular segment, which for discussion purposes is referred to as a "logical-to-instance segment mapping." The logical-to-instance segment mapping provides enough information for the client-side media processing unit to generate the contents of the movie fragment random access box of the ISO media file format.

In addition to (or in lieu of) storing the received media data associated with a particular instance of a particular segment, the client-side media processing unit may store the contents of the sequence map box and/or the instance identifier box. Prior to or during playback of a particular sequence of the media presentation (either by the same client-side media processing unit or a different client-side media processing unit), the box contents can be used to request distribution of different instances of particular segments (for example, instances that share a common encodingID.)

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

A file format and techniques for using the file format in connection with the distribution and presentation of media presentations are described herein. The file format supports the flexible, efficient use of limited media processing and/or network resources, and accommodates fluctuations in availability of online and/or offline resources associated with media presentations, through the arrangement of a particular sequence of media data as a number of independently distributable and storable, interchangeable segments having different encoding characteristics.

Figure 1:
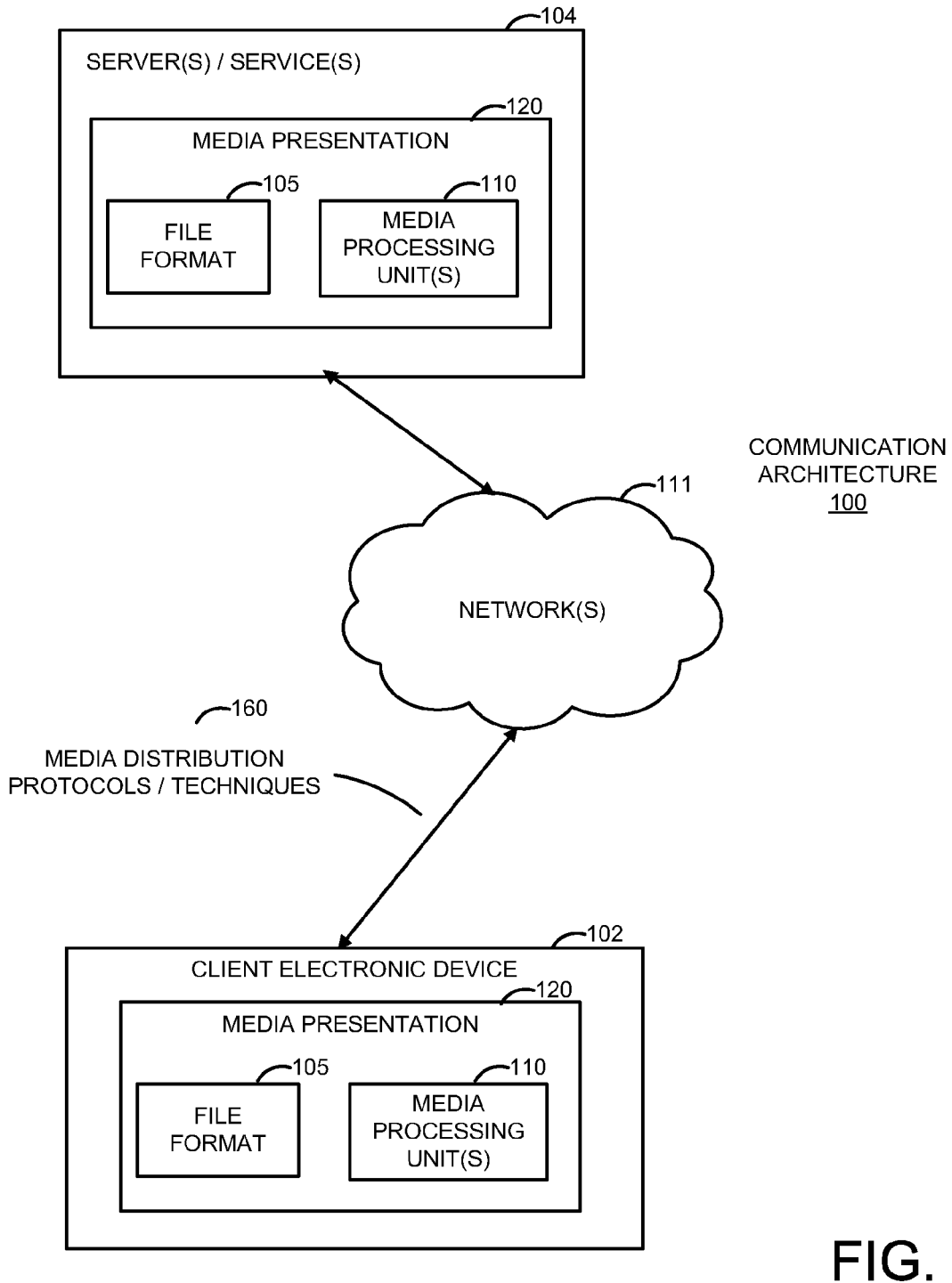
FIG. 1 is a simplified block diagram of an exemplary communication architecture via which a media presentation is distributed and/or presented.

Turning now to the drawings, where like numerals represent like components, FIG. 1 is a simplified block diagram of an exemplary communication architecture 100 via which a media presentation ("MP") 120, which is arranged in accordance with a file format 105 and which generally originates from one or more network-based servers/services 104, is distributed via network(s) 111/media distribution protocols and/or techniques 160 to a client electronic device ("CED") 102. Client- and server-based media processing units ("MPUs") facilitate distribution, presentation, and/or storage of MP 120.

MP 120 represents any commercial or non-commercial digital media content, including but not limited to media content such as audio, video, images, text, and graphics, which is arranged into one or more sequences of media data (sequences and arrangements thereof are shown and discussed further below in connection with FIG. 2). A particular sequence is composed of a number or ordered segments of media data (for example, time-ordered or numerically-ordered segments), which are independently distributable to and/or storable. File format 105 (shown and discussed further below in connection with FIG. 3) facilitates distribution and presentation of MP 120. It will be understood that a particular MP or sequence thereof may be, or may include, portions of what would be considered to be a larger work, may exist in any known or later developed format or combination of formats, and may be protected by one or more enforceable intellectual property rights of one or more entities, such as copyrights, patent rights, trademark rights, or trade secret rights.

Server(s)/service(s) 104 represent any known or later developed sources of MP 120 or information associated therewith, including but not limited to: data storage servers/services; server-side MPUs 110; digital rights management ("DRM") servers/services, authentication, authorization, and/or accounting servers/services; digital media content servers/services (for example, music or video downloading, on-demand, broadcasting, or advertising production or distribution entities or servers/services); peer devices or servers/services; and the like. A number of servers/services 104 may directly or indirectly collaborate to identify, package, and distribute aspects of MP 120.

Networks 111 represent any existing or future, public or private, wired or wireless, wide-area or local-area, packet-switched or circuit-switched, one-way or two-way digital data transmission infrastructures or technologies configured to support any known or later developed media distribution protocols or techniques 160. Exemplary networks 111 include: the Internet; managed wide-area networks (for example, cellular networks, satellite networks, fiber-optic networks, co-axial cable networks, hybrid networks, copper wire networks, and over-the-air broadcasting or data casting networks); wireless local area networks; and personal area networks. Different types of networks 111 have different, often interdependent characteristics, such as speed, availability, bandwidth, usage level, and usage cost.

CED 102 is any electronic device (or any physical or logical element of such an electronic device, either standing alone or included in other devices), which is configured for communication via any network(s) 111 to receive media presentation 120. CED 102 itself may be configured to store and/or render MP 120, or alternatively to pass MP 120 to a device configured to store and/or render MP 120. Examples of CED 102 include but are not limited to: PCs; mobile phones; personal digital assistants; personal media players; computer/television devices; set-top boxes; hard-drive storage devices; video cameras; DVD players; cable modems; gaming consoles; local media gateways; and devices temporarily or permanently mounted in transportation equipment such as wheeled vehicles, planes, or trains.

Server-side and client-side MPUs 110 are responsible for aspects of distribution MP 120, and performing processing tasks to prepare the media content associated with MP 120 for presentation to a user and/or for storage. Acts associated with distribution include transmitting (in the case of the server-side MPU) and receiving (in the case of the client-side MPU) MP 120, and information/messaging associated therewith (in the case of both the client-side and the server-side MPUs). MPUs 110 may be in the form of hardware, software, firmware, or any combination thereof, and generally include components such as transceivers, multiplexers/demultiplexers, encoders/decoders ("codecs"), encrypters/decrypters, and the like. It will be appreciated that any known or later developed framework may be used to implement MPUs 110.

Figure 2:
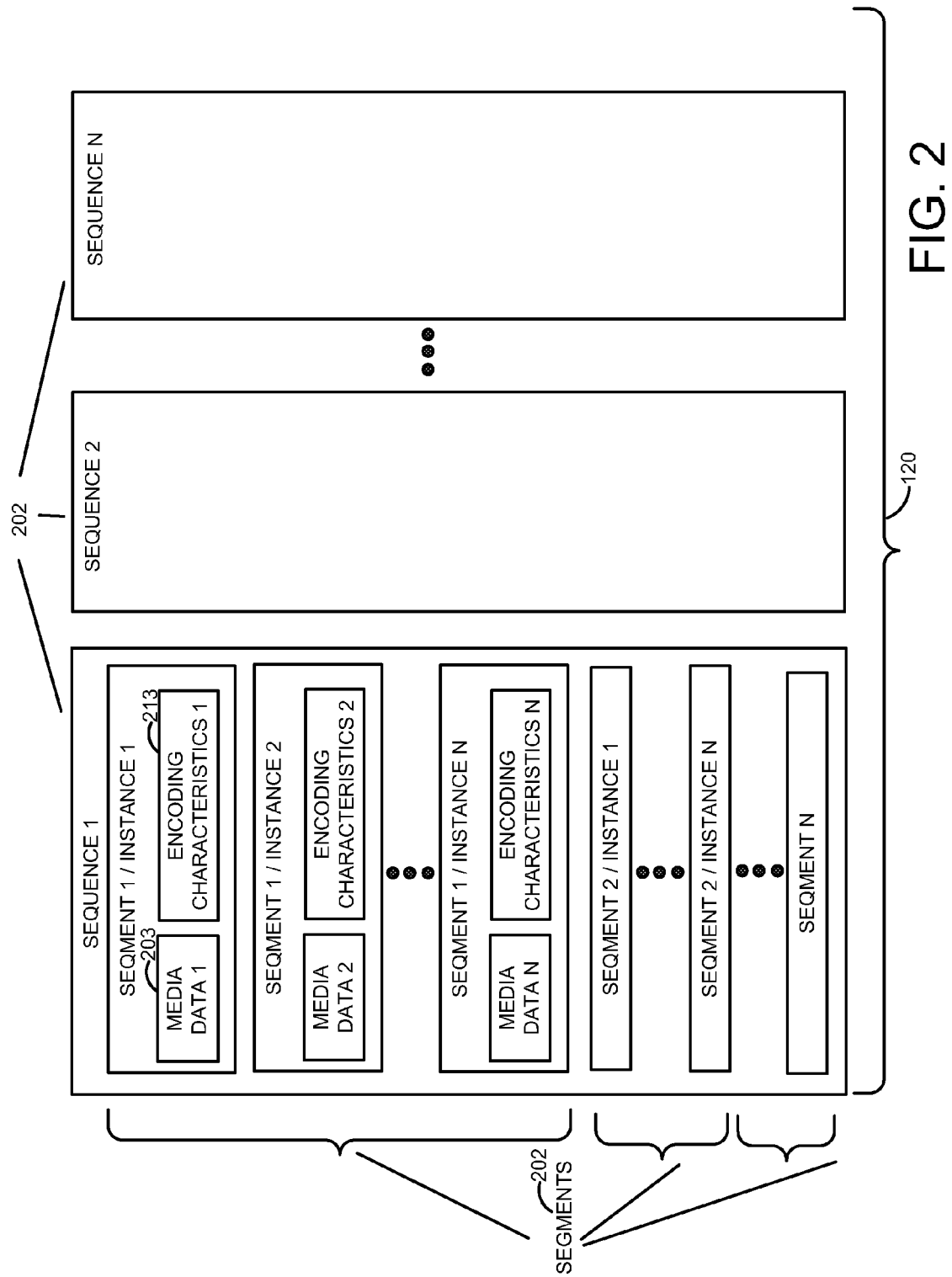
FIG. 2 is a simplified functional block diagram of certain aspects of the media presentation shown in FIG. 1.

With continuing reference to FIG. 1, FIG. 2 is a simplified functional block diagram of certain aspects of an arrangement of MP 120. In accordance with the arrangement set forth herein, MP 120 is composed of one or more sequences 201 (sequences 1 through N are shown). For discussion purposes, a particular sequence is referred to as having a particular "sequenceID." A particular sequence is further arranged into a number of ordered segments 202 (for example, time-ordered or numerically-ordered segments—segments 1 through N of sequence1 are shown) of media data 203 (media data associated with segment1 is shown), which are independently distributable and/or storable. For discussion purposes, a particular segment is referred to as having a particular "segmentID." The amount of media data 203 in a segment is usually but not necessarily based on an amount of media data that is presentable within a certain amount of time (an exemplary segment is approximately two seconds), although other arrangements are possible. It will be appreciated that naming conventions used herein are for illustrative purposes only, and that any desired naming conventions may be used. Each segment 202 is encoded using a set of encoding characteristics 213, to form one or more instances 250 of the segment (instances 1 through N of segment 1/sequence1 are shown). For discussion purposes, each instance of a particular segment is referred to as having a unique "instanceID." Each instance of a particular segment shares the same sequence ID and segmentID.

When multiple instances 250 of a particular segment are created, different sets of encoding characteristics 213 are generally used to create each instance. In a particular sequence, segmentIDs having the same encoding characteristics can be identified via an encoding characteristics identifier, which is referred to discussion purposes as an "encodingID."

Examples of encoding characteristics that can be modified collectively or individually include but are not limited to: compression ratios; encoding rates; encoding languages; encoding formats; encryption formats; media data presentation rates; and the like. It may also be possible to specify alternate media data source identities or locations, and/or the amounts of media data associated with particular segments or instances (generally, the amount of media data remains presentable within the same amount of time to simplify rendering, although this may not always be necessary). By varying encoding characteristics of a particular segment, server-side and client-side MPUs 110 having very different operating environments and conditions—both dynamic and static—are accommodated to facilitate the efficient and relatively glitch-free distribution and/or presentation of a particular media presentation.

Figure 3:
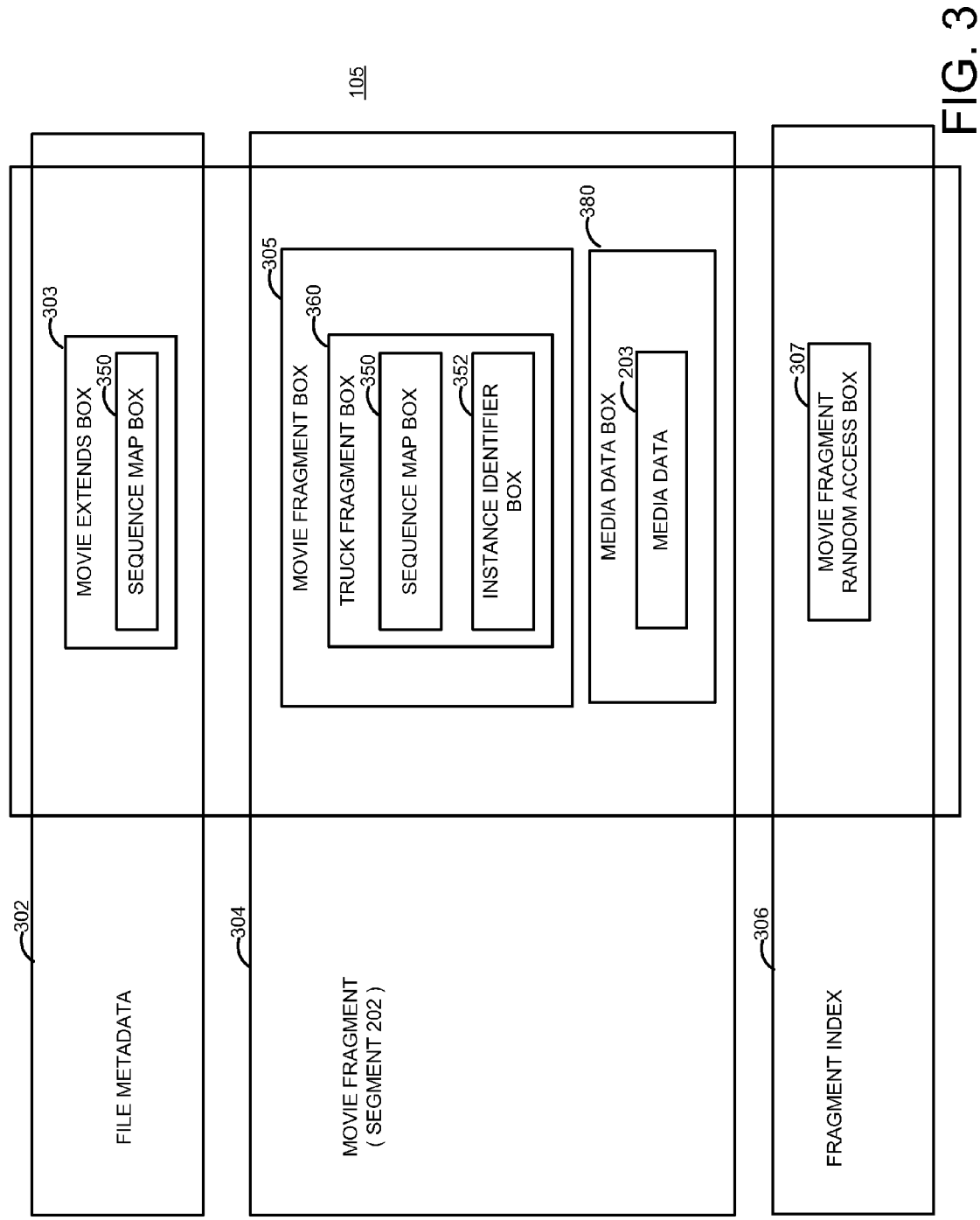
FIG. 3 is a simplified functional block diagram of certain aspects of the file format shown in FIG. 1, which facilitates distribution and presentation of the media presentation shown in FIG. 2.

With continuing reference to FIGS. 1 and 2, FIG. 3 is a simplified functional block diagram of certain aspects of file format 105, which facilitates distribution and presentation of MP 120. File format 105 specifies, among other things, the time-ordered segments of which particular sequences of a media presentation are composed, along with metadata regarding the segments. In accordance with an exemplary implementation of the file format described herein, aspects of MP 120 are distributed (for streaming and/or download) as media files in accordance with the "ISO base media file format" ("ISO BMFF"), established by the International Organization for Standardization ("ISO"). It will be appreciated that other known or later developed media file formats that support both distribution and storage/playback of media content are possible, however.

The ISO BMFF specifies that a media file is formed as a series of data structures called "boxes." A box is an object-oriented building block defined by a unique type identifier and length. Boxes start with a header, which sets forth the box size and type thereof. A container box is a box whose purpose is to contain and group a set of related boxes. It will be understood that when a sub-box is defined herein and proposed to be included in a particular box specified by the ISO BMFF, the sub-box sets forth certain information that can be conveyed via the box in which it is included, or another sub-box thereof. In practice, however, the proposed sub-box may be included in whichever box specified by the ISO BMFF (or other media file format specification) is practical based on the function of the proposed sub-box and the information it includes.

In accordance with the file structure proposed herein, a particular segment 202 of a particular sequence 201 of a particular MP 120 is defined as a movie fragment 304. A movie fragment is a construct specified by the "ISO base media file format" established by the International Organization for Standardization ("ISO.") A movie extends box 303, which is specified by the ISO BMFF, is a container box for file metadata 302. The presence of movie extends box 303 notifies client-side MPU 110 that MP 120 may contain movie fragments 304.

For each movie fragment 304/segment 202 of a particular sequence 201, there is a movie fragment box 305 and a media data box 380. Media data box 380 encapsulates media data 203 for the particular segment (generally, media data 203 associated with a particular requested instance of the particular segment, as discussed further below in connection with FIG. 4). Movie fragment box 305 is a top-level box, which as specified by the ISO BMFF contains a movie fragment header box (not shown) and one or more track fragment boxes (not shown). A movie fragment random access box 307 provides a table that may assist MPUs 110 in finding random access points in a file using movie fragments. This box provides only a hint as to where random access points are; the movie fragments/segments themselves are definitive.

Two sub-boxes are proposed herein—a sequence map box 350, which as shown is encapsulated either by movie extends box 303 or movie fragment box 305 (or both), and an instance identifier box 352, which as shown is encapsulated by movie fragment box 305. It will be appreciated, however, that the proposed sub-boxes may be encapsulated by any file format box that facilitates performance of the function(s) of the sub-boxes.

Sequence map box 350 stores a logical arrangement of segmentIDs-to-instanceIDs for a particular sequenceID, along with information such as encoding characteristics (encodingIDs, for example) and storage locations (or references thereto, such as vectors, URLs, or pointers) for copies of each instance. Sequence map box 350 is generally used for determining, based on instance selection criteria (instance selection criteria are discussed further below, in connection with FIG. 5), which instance of a particular segment will be distributed to client-side MPU 110 and/or played back by client-side MPU. Segments can be concatenated together and be played by the client-side MPU without being connected to a server, and any client-side MPU, even one that did not originally receive a particular media presentation file, can download segments to patch the file. In one exemplary scenario, sequence map box 350 (or a reference thereto) is transmitted to a server-side or client-side MPU in connection with distribution of a particular sequence of a media presentation to either the same or a different a server- or client-side MPU.

Exemplary SDL syntax for the contents of sequence map box 350 is set forth below.

```
aligned(8) class LogicalSequenceMapBox extends FullBox('uuid', version
        = 1, 0) {
    int i;
    string              Location;              //URL to movie
                                                map
    unsigned int(32)    entry_ count;
    for (i=1; i ≤ entry_count; i++) {
        unsigned int(32)     SequenceNumber;         //fragment
                                                     sequence number
        unsigned int(8)[16] LogicalSequenceID;  //GUID of logical
                                                     segment
        unsigned int(8)[16] LogicalSegmentID;         //GUID of
                                                     logical segment
        unsigned int(8)[16] InstanceSegmentID;   //GUID of instance
                                                     segment
    }
}
```

A table representation of sequence map box 350 is set forth in Table 1.

TABLE 1

| Field Name | Field Type | Field Description |
| --- | --- | --- |
| Size | unsigned int(32) | Size of the Box |
| Type | unsigned int(32) | Type of Box (4CC) |
| Usertype | unsigned int(8)[16] | Type of Box (GUID) |
| Version | unsigned int(8) | Version of Box definition |
| Flags | unsigned int(24) | Bit field of flags |
| Location | string | URL to map of all instance segments for movie |
| entry_count | unsigned int(32) | Number of segments in file |
| SequenceNumber | unsigned int(32) | Sequence number from movie fragment header |
| LogicalSequenceID | unsigned int(8)[16] | GUID of logical sequence |
| LogicalSegmentID | unsigned int(8)[16] | GUID of logical segment |
| InstanceSegmentID | unsigned int(8)[16] | GUID of instance segment |

Instance identifier box 352 encapsulates information regarding the requested/selected instance (such as instanceID and/or encodingID), and also references a logical arrangement of instanceIDs for the particular segment, which for discussion purposes is referred to as a "logical-to-instance segment mapping." The logical-to-instance segment mapping provides enough information for a client-side MPU to generate the contents of movie fragment random access box 307.

Exemplary Semantic Description Language ("SDL") syntax for the logical-to-instance segment mapping within instance identifier box 352 is set forth below.

```
aligned(8) class LogicalToInstanceSegmentBox extends FullBox('uuid',
          version = 1, 0) {
    unsigned int(8)[16] LogicalSequenceID;   //GUID of logical
                                              segment
    unsigned int(8)[16] LogicalSegmentID;    //GUID of logical
                                              segment
    unsigned int(8)[16] InstanceSegmentID;   //GUID of instance
                                              segment
    }
}
```

A table representation of instance identifier box 352 is set forth in Table 2.

TABLE 2

| Field Name | Field Type | Field Description |
| --- | --- | --- |
| Size | unsigned int(32) | Size of the Box |
| Type | unsigned int(32) | Type of Box (4CC) |
| Usertype | unsigned int(8)[16] | Type of Box (GUID) |
| Version | unsigned int(8) | Version of Box definition |
| Flags | unsigned int(24) | Bit field of flags |
| LogicalSequenceID | unsigned int(8)[16] | GUID of logical sequence |
| LogicalSegmentID | unsigned int(8)[16] | GUID of logical segment |
| InstanceSegmentID | unsigned int(8)[16] | GUID of instance segment |

Figure 6:
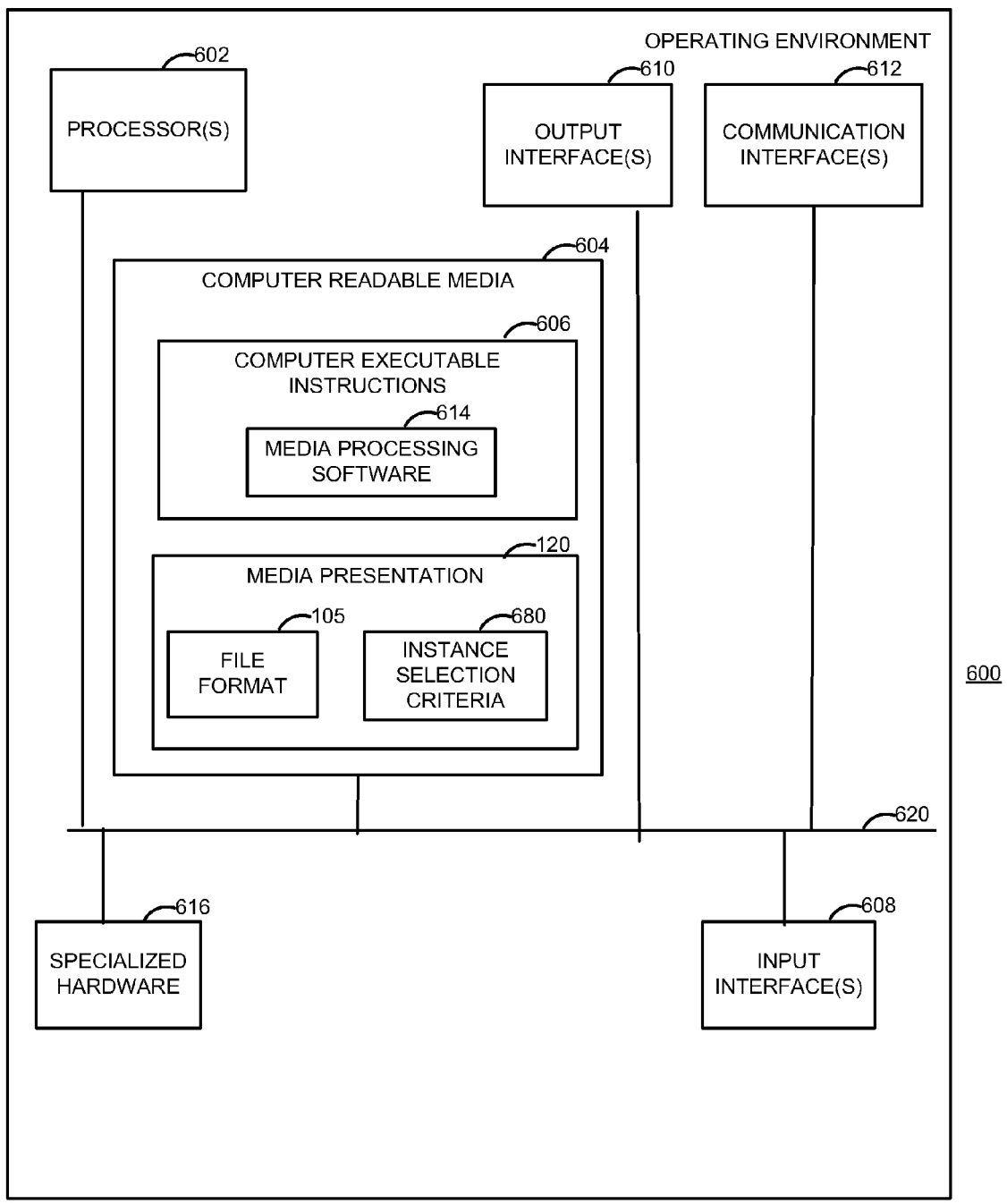
FIG. 6 is a simplified block diagram of an exemplary operating environment in which aspects of the communication architecture shown in FIG. 1 and/or the method(s) shown in FIGS. 4 and 5 may be implemented or used.

With continuing reference to FIGS. 1-3, FIG. 4 is a flowchart illustrating certain aspects of a method for distributing a digital media presentation, such as a digital media presentation arranged in accordance with the file format shown in FIG. 3. The method shown in FIG. 4 may be implemented in one or more general, multi-purpose, or single-purpose processors, such as processor 602 discussed further below in connection with FIG. 6. Aspects of the illustrated method are generally performed by networked server(s)/service(s) 104, including server-side MPU 110, and occur in connection with the creating, packaging/formatting, and/or arranging for transmission of the media data associated with a particular sequence of a digital media presentation. Unless specifically stated, the method is not constrained to a particular order or sequence. In addition, some of the described steps or elements thereof can occur or be performed concurrently.

The method begins at block 400, and continues at block 402, where a particular sequence of a media presentation, such as sequence1 201 of media presentation 120, is identified. Next, at block 404, one or more segments of the sequence are identified, such as segment1 250 (for discussion purposes, one segment is referred to herein, although aspects of the method may be performed concurrently or serially for other segments of a particular sequence). As indicated at block 406, multiple instances of the identified segment are encoded using different encoding characteristics, as discussed in connection with FIG. 3, and stored in persistent or temporary memory in one or more locations (generally, network-side locations, although network-side storage is not necessary depending on desired distribution techniques). An instance identifier map for the segment is generated and stored in a first data structure associated with the file format (such as a box), as indicated at block 408, and at block 410, the first data structure is distributed to a server-side or client-side MPU 110.

In the exemplary implementation discussed herein, the logical arrangement of segmentIDs-to-instanceIDs for a particular sequenceID, along with information such as encoding characteristics (encodingIDs, for example) and storage locations (or references thereto, such as vectors, URLs, or pointers) for copies of each instance are generated and stored in sequence map box 350, as discussed in connection with FIG. 3.

As indicated at block 414, when a request for distribution of a particular instance of the segment is received from a client-side or server-side MPU, the requested segment identifier is encapsulated within a second data structure. In the exemplary implementation, instance identifier box 352 encapsulates information regarding the requested instance (such as instanceID and/or encodingID), and also references the logical-to-instance segment mapping, which, as discussed in connection with FIG. 3, is a logical arrangement of instanceIDs for the particular segment. The requested instance of the segment itself is encapsulated within a third data structure, such as media data box 380, as indicated at block 416.

At block 418, the second and third data structures are distributed to the client-side and/or server-side MPU, which stores the contents of the data structures and uses the stored contents to patch up the sequence with different segment instances prior to or during playback of the sequence. As discussed above, segments can be concatenated together and be played by the client-side MPU without being connected to a server, and any client-side MPU, even one that did not originally receive a particular sequence (via streaming or downloading, for example) can request segments to patch the sequence.

It will be understood that communications between client-side MPU 110, servers/services 104, and/or server-side MPU 110 can occur over any now known or later-developed communication medium and/or transport protocol.

Figure 5:
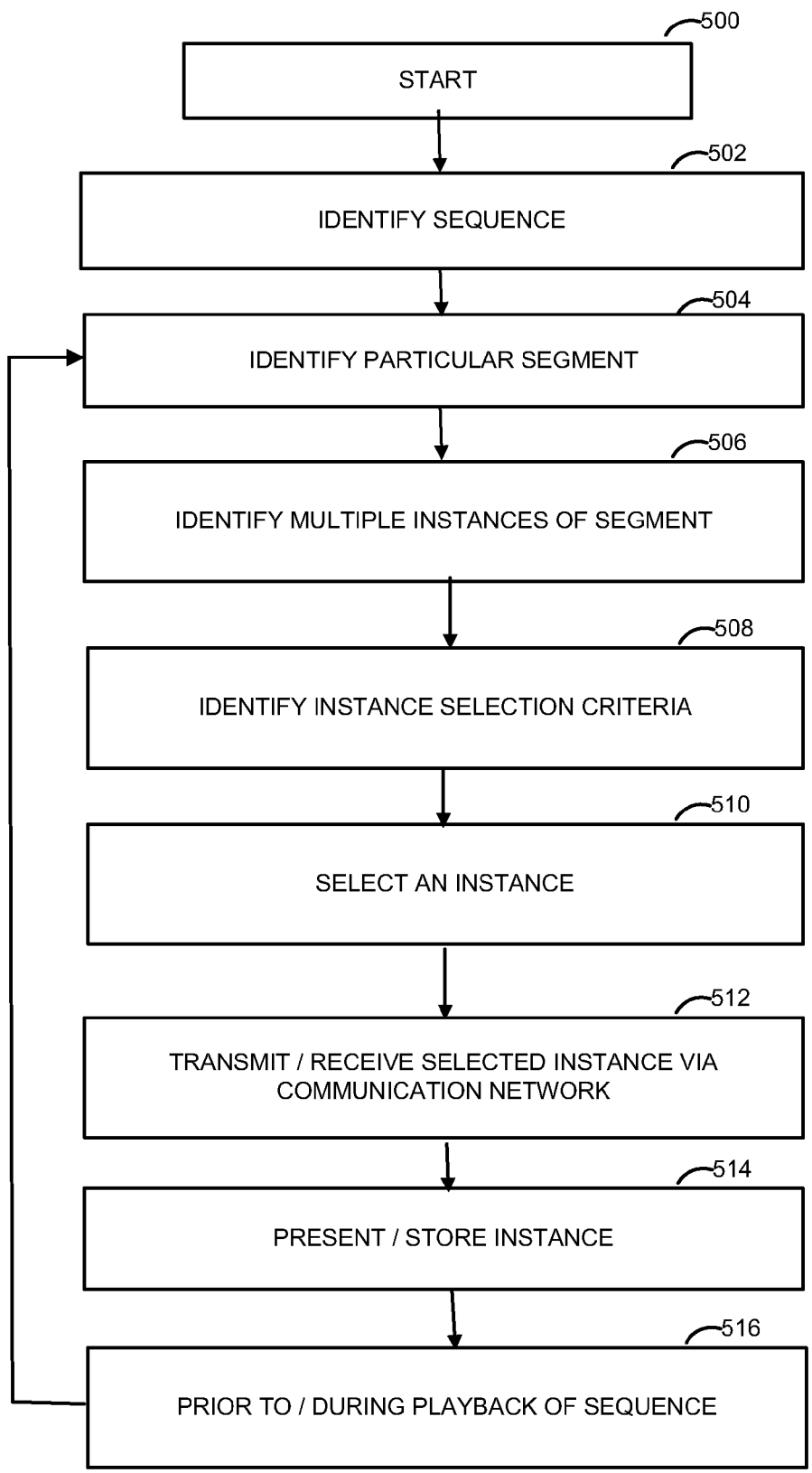
FIG. 5 is a flowchart illustrating certain aspects of a method for presenting a digital media presentation, such as a digital media presentation arranged in accordance with the file format shown in FIG. 2.

FIG. 5 is a flowchart illustrating certain aspects of a method for presenting a digital media presentation, such as a digital media presentation arranged in accordance with the file format shown in FIG. 3. The method shown in FIG. 5 may be implemented in one or more general, multi-purpose, or single-purpose processors, such as processor 602 discussed further below in connection with FIG. 6. Aspects of the illustrated method may be performed by networked server(s)/service(s) 104, including server-side MPU 110 and/or CED 102, including client-side MPU 110. For exemplary purposes, both client-side acts and network-side acts may be discussed. Unless specifically stated, the method is not constrained to a particular order or sequence. In addition, some of the described steps or elements thereof can occur or be performed concurrently.

The method begins at block 500, and continues at block 502, where a particular sequence of a media presentation, such as sequence1 201 of media presentation 120, is identified. Sequence1 201 may be identified for distribution (using push or pull techniques) by a networked server/service 104 or requested by CED 102 in accordance with any desirable technique, at various times and for various reasons, such as prior to or during distribution to and/or playback by CED 102 of a larger media presentation. Next, at block 504, one or more segments of the sequence are identified, such as segment1 250 (for discussion purposes, one segment is referred to herein, although aspects of the method may be performed concurrently or serially for other segments of a particular sequence). For discussion purposes, it is assumed that CED 102 is aware of the particular sequence is to be distributed for presentation and/or storage, and the segments thereof.

As indicated at block 506, multiple instances of the segment are identified. In one exemplary implementation, sequence map box 350 facilitates identification of instances of the segment. As discussed above in connection with FIG. 3, sequence map box 350 encapsulates a logical arrangement of segmentIDs-to-sequenceIDs for a particular sequenceID, along with information such as encoding characteristics (encoding IDs, for example) and storage locations (or references thereto, such as vectors, URLs, or pointers) for copies of each instance. A logical-to-instance segment mapping (an arrangement of instanceIDs for a particular segment) may also be included within sequence map box 350. In one scenario, the sequence map box is encapsulated by movie extends box 303. In another scenario, the sequence map box is encapsulated by movie fragment box 305.

In another exemplary implementation, identification of the instances of the segment is facilitated by instance identifier box 352. As discussed in connection with FIG. 3, instance identifier box 352 encapsulates information regarding the requested instance (such as instanceID and/or encodingID), and also references the logical-to-instance segment mapping, which is a logical arrangement of instanceIDs for the particular segment. In one scenario, instance identifier box 352 is encapsulated by movie fragment box 305—within a track fragment box, for example.

Irrespective of the data structure that is used to identify instances of the segment, the data structure is transmitted to a client-side or server-side MPU prior to the time at which a particular segment is scheduled for distribution or playback or both (if the data structure is saved after initial transmission, then transmission at the time of playback may not occur). In one exemplary scenario, the data structure is transmitted to a server-side or client-side MPU in connection with distribution of a particular sequence of a media presentation to either the same or a different server- or client-side MPU.

As indicated at block 508, instance selection criteria is/are identified, and an instance is selected based on the instance selection criteria, at block 510. For example, the contents of sequence map box 350 and/or instance identifier box 352 may be used for determining, based on instance selection criteria, which instance of a particular segment will be distributed to a client-side MPU 110 and/or played back by client-side MPU. Instance selection criteria include any information usable for decision-making regarding distribution of MP 120—generally, instance selection criteria facilitate selection of instances having encoding characteristics that ensure that a particular MPU can efficiently and accurately distribute, present, and/or store a particular segment. Instance selection criteria may be based on characteristics of network(s) 111, server-side MPU 110, or client-side MPU 110 (or other characteristics), including but not limited to: availability of a communication network; speed of a communication network; available bandwidth of a communication network; cost of a communication network; and/or available computing resources of a particular MPU 110. Instance selection criteria may be static or dynamic, and may be stored in any desired location (or created at runtime).

As indicated at block 512, a selected instance of the segment is distributed (transmitted and/or received from/to a particular MPU) via a communication network, such as one or more communication networks 111. It will be understood that communications between client-side MPU 110, servers/services 104, and/or server-side MPU 110 can occur over any now known or later-developed communication medium and/or transport protocol. In the exemplary implementation, a request for distribution of a particular instance of the segment is transmitted/received from a client-side or server-side MPU, and in response to the request, the contents of instance identifier box 352 (that is, instanceID and/or encodingID, and the logical-to-instance segment mapping) are distributed along with the encoded media data of the selected/requested instance. In one scenario, the contents of the instance identifier box 352 are encapsulated by media fragment box 305, and the encoded media data of the selected/requested instance is encapsulated within a media data box 380.

At block 514, the selected instance is presented and/or stored. Selected/requested instances are generally demultiplexed, decompressed, decoded, and/or decrypted in connection with presenting, although such processing may or may not occur in connection with storage. In addition to (or in lieu of) storing the requested/received media data 203 associated with a particular instance of a particular segment, the client-side MPU may store the contents of the sequence map box and/or the instance identifier box, to form a record of which instance of a particular segment was distributed. Then, as indicated at block 516, prior to or during playback of a particular sequence of the media presentation, the logical-to-instance segment mapping and/or the logical arrangement of segmentIDs-to-sequenceIDs for a particular sequenceID, can be used to determine what was distributed, what is available, and to request distribution of different instances of particular segments (for example, instances that share a common encodingID.) As discussed above, segments can be concatenated together and be played by the client-side MPU without being connected to a server, and any client-side MPU, even one that did not originally receive a particular sequence (via streaming or downloading, for example) can request segments to patch the sequence.

In this manner, arbitrary instances of segments can be stitched together and interchanged—at distribution or playback time—to form a valid file, the efficient use of limited media processing and/or network resources can be supported, and fluctuations in the resource availability can be accommodated, while providing a relatively glitch-free and predictable user experience.

Figure 4:
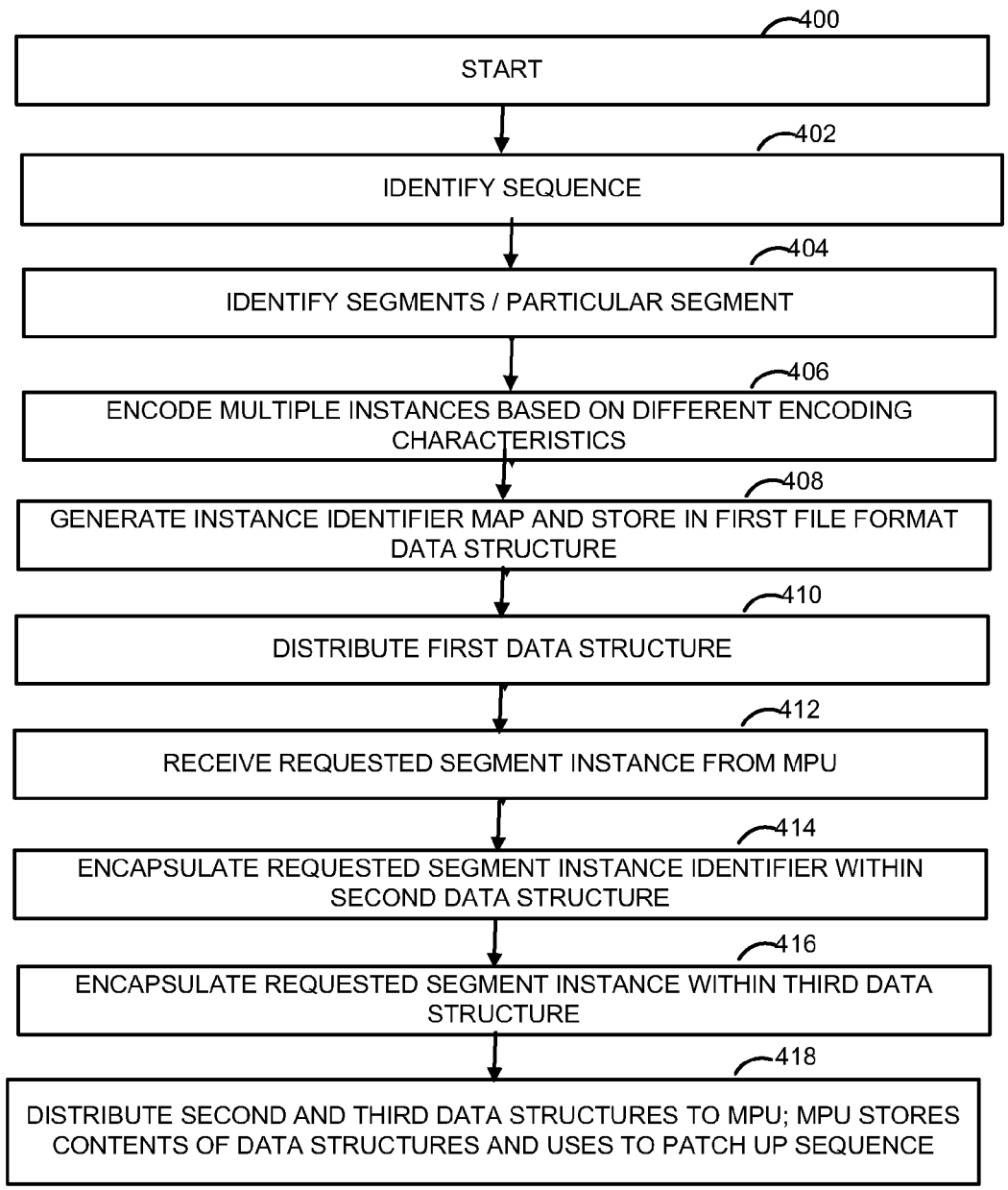
FIG. 4 is a flowchart illustrating certain aspects of a method for distributing a digital media presentation, such as a digital media presentation arranged in accordance with the file format shown in FIG. 2.

With continuing reference to FIGS. 1 through 6, FIG. 6 is a simplified block diagram of an exemplary operating environment 600 in which aspects of the communication architecture shown in FIG. 1, the media presentation shown in FIG. 2, the file format shown in FIG. 3, and/or the method(s) shown in FIGS. 4 and 5 may be implemented or used. Operating environment 600 is generally indicative of a wide variety of general-purpose or special-purpose computing environments, and is not intended to suggest any limitation as to the scope of use or functionality of the system(s) and methods described herein. For example, operating environment 600 may be a client electronic device such as a mobile phone, a personal digital assistant, a personal computer, a personal media player, a computer/television device, a set-top box, a hard-drive storage device, a video camera, a DVD player, a cable modem, a local media gateway, a device temporarily or permanently mounted in transportation equipment such as a wheeled vehicle, a plane, or a train, or another type of known or later developed consumer electronic device. Operating environment 600 may also be a type of networked server, or any aspect thereof. Such a server may be part of a distributed computing network, and may be used to implement, host, or proxy any type of network-based service in whole or in part.

As shown, operating environment 600 includes processor 602, computer-readable media 604, and computer-executable instructions 606. One or more internal buses 620 may be used to carry data, addresses, control signals, and other information within, to, or from operating environment 600 or elements thereof.

Processor 602, which may be a real or a virtual processor, controls functions of the operating environment by executing computer-executable instructions 606. The processor may execute instructions at the assembly, compiled, or machine-level to perform a particular process.

Computer-readable media 604 may represent any number and combination of local or remote devices, in any form, now known or later developed, capable of recording, storing, or transmitting computer-readable data, such as the above-noted computer-executable instructions 606 (media processing software 614 is shown), media presentation 120, file format 105, and/or instance selection criteria 680. In particular, computer-readable media 604 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 606 represent any signal processing methods or stored instructions. Generally, computer-executable instructions 606 are implemented as software components according to well-known practices for component-based software development, and encoded in computer-readable media. Computer programs may be combined or distributed in various ways. Computer-executable instructions 606, however, are not limited to implementation by any specific embodiments of computer programs, and in other instances may be implemented by, or executed in, hardware, software, firmware, or any combination thereof.

Input interface(s) 608 are any now known or later developed physical or logical elements that facilitate receipt of input to operating environment 600.

Output interface(s) 610 are any now known or later developed physical or logical elements that facilitate provisioning of output from operating environment 600.

Communication interface(s) 612 represent one or more physical or logical elements, such as connectivity devices or computer-executable instructions, which enable communication between operating environment 600 and external devices or services, via one or more protocols or techniques. Such communication may be, but is not necessarily, client-server type communication or peer-to-peer communication. Information received at a given network interface may traverse one or more layers of a communication protocol stack.

Specialized hardware 616 represents any hardware or firmware that implements functions of operating environment 600. Examples of specialized hardware include encoder/decoders decrypters, application-specific integrated circuits, clocks, and the like.

It will be appreciated that particular configurations of operating environment 600 may include fewer, more, or different components or functions than those described. In addition, functional components of operating environment 600 may be implemented by one or more devices, which are co-located or remotely located, in a variety of ways.

Figure 7:
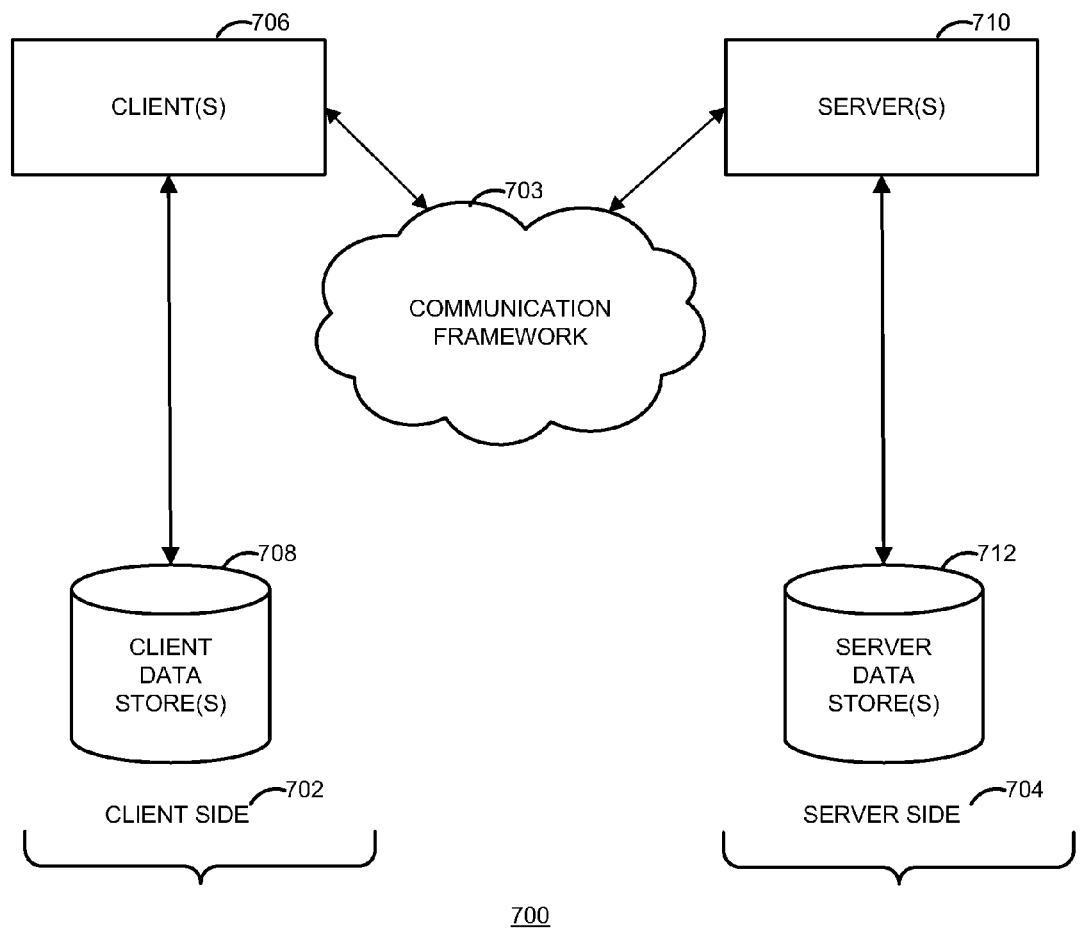
FIG. 7 is a simplified block diagram of a client-server architecture in which aspects of the operating environment shown in FIG. 7 may be implemented or used.

FIG. 7 is a simplified functional diagram of a client-server architecture 700 in connection with which aspects of operating environment 600 may be implemented or used. One or more aspects of operating environment 600 may be represented on a client-side 702 of architecture 700 or on a server-side 704 of architecture 700. As shown, communication framework 703 (which may be implemented by any aspect of communication architecture 100) facilitates communication between client-side 702 and server-side 704.

On client-side 702, one or more clients 706, which may be implemented in hardware, software, firmware, or any combination thereof, are responsive to client data stores 708. Client data stores 708 may be computer-readable media 604, employed to store information local to clients 706. On server-side 704, one or more servers 710 are responsive to server data stores 712. Like client data stores 708, server data stores 712 may include one or more computer-readable media 604, employed to store information local to servers 710.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A method for presenting a digital media presentation including at least one sequence of digital media content, wherein each sequence is arranged in accordance with a predetermined file format and comprises a plurality of segments for sequential presentation by a digital media processing unit, each segment including a respective different predetermined amount of the digital media content to be presented, the method comprising:
providing a sequence having plural segments each comprising at least a first segment instance created by encoding the digital media content of the segment based on a first set of encoding characteristics and a second segment instance created by encoding the digital media content of the segment based on a second set of encoding characteristics different from the first set of encoding characteristics,
wherein the segments are independently distributable and storable, each sequence having a sequence ID associated therewith, each segment having a segment ID associated therewith and each segment instance having an instance ID associated therewith;
receiving at the media processing unit segment instances of plural segments to be presented and a plurality of data structures,
a first of the data structures including a map of the instance IDs, and a logical arrangement of the segments IDs to the instance IDs, a second data structure storing a replacement instance ID associated with a replacement segment instance requested by the media processing unit and a third data structure storing the replacement segment instance;
storing at least the first data structure;
arranging for sequential presentation of the respective digital media content of the received segments; and
identifying a particular segment requiring replacement of one segment instance with another segment instance sharing a common encoding ID based on predetermined instance selection criteria applied by the media processing unit,
wherein the media processing unit uses the plurality of data structures to dynamically select for presentation the replacement segment instance based on the instance selection criteria while arranging for presentation of the respective digital media content of the received segment instances, wherein using the plurality of data structures includes accessing the first data structure from storage,
wherein the replacing includes forming a valid file by concatenating together and interchanging the replacement segments at distribution or playback at the media processing unit without being connected to a server.

2. The method according to claim 1, wherein:
the media processing unit comprises a client-side media processing unit; and
the arranging step includes presentation of the sequence by the client-side media processing unit, with distribution of the replacement segment instance to the client-side media processing unit being dynamically requested via a communication network during the presentation and being presented in the sequence.

3. The method according to claim 2, wherein the distribution is accomplished via a distribution technique selected from the group comprising: synchronous; asynchronous; live; on-demand; streaming; and downloading.

4. The method according to claim 2, wherein the instance selection criteria are based on one or more characteristics of the client-side media processing unit or the communication network or both, the instance selection criteria selected from the group comprising: availability of the communication network; speed of the communication network; available bandwidth of the communication network; cost of the communication network; and available computing resources of the client-side media processing unit.

5. The method according to claim 2, further comprising:
prior to the arranging step, receiving a data structure associated with the file format, the data structure storing metadata used for identifying a received segment instance and selecting the replacement segment instance.

6. The method according to claim 5, wherein the data structure comprises a map of instance identifiers and locations thereof.

7. The method according to claim 6, wherein the data structure is stored within a movie extends box specified by the base media file format established by the International Organization for Standardization ("ISO").

8. The method according to claim 5, wherein:
the client-side media processing unit requests distribution of the selected replacement segment instance based on the data structure;
the client-side media processing unit receives the selected replacement segment instance pursuant to the request; and
in the arranging step the client-side media processing unit either stores or presents, or both, the received selected replacement segment instance.

9. The method according to claim 8, wherein:
the data structure stores a first segment instance identifier data structure associated with the predetermined file format and a second segment instance identifier data structure associated with the predetermined file format, the first and second segment instance identifier data structures being associated with a movie fragment box defined for the particular segment, the movie fragment box being specified by the base media file format established by the International Organization for Standardization ("ISO");
the client-side media processing unit stores the instance identifier data structure associated with the received selected replacement segment instance; and
prior to or during presentation of the sequence the client-side media processing unit uses the stored replacement second instance identifier data structure to request distribution of the replacement segment instance to the client-side media processing unit, with the replacement segment instance replacing another segment instance during presentation of the sequence by the client-side media processing unit.

10. The method according to claim 9, wherein the client-side media processing unit stores the instance identifier data structure in a client-side data structure that forms a record of individual instance identifier data structures stored for each of the plurality of segments of the sequence.

11. The method according to claim 9, wherein the instance identifier data structure associated with the received selected segment is stored in a track fragments header box associated with the movie fragment box for the particular segment.

12. A method for distributing a digital media presentation, the method comprising:

provide at least one sequence of digital media data content, each sequence being arranged in accordance with a predetermined file format, wherein each sequence comprises a plurality of segments for sequential presentation by a digital media processing unit, each segment including a respective different predetermined amount of the digital media content to be presented, each sequence having a sequence identifier associated therewith, each segment having a segment identifier associated therewith and each segment instance having an instance identifier associated therewith;

for each segment, producing at least a first segment instance by encoding the predetermined amount of digital media content based on a first set of encoding characteristics and a second segment instance of each of the plural segments created by encoding the digital media content of the segment based on a second set of encoding characteristics different from the first set of encoding characteristics, wherein the segments are independently distributable and storable;

generating instance identifiers that individually reference the segment instances of a segment;

encapsulating the instance identifiers of a segment within a first data structure associated with the predetermined file format, the first data structure including a map of the instance identifiers and a logical arrangement of the segment identifiers to the instance identifiers;

distributing a plurality of the first data structures to the media processing unit, the first data structures being usable by the media processing unit to request distribution of a particular instance of a segment in the sequence to form a requested segment instance of the segment and a non-requested segment instance comprising another instance of the same segment;

encapsulating each instance identifier within an associated second data structure associated with the predetermined file format, the second data structure storing a replacement instance identifier associated with a replacement segment instance requested by the media processing unit;

encapsulating the digital media content of each segment instance of a segment within an associated third data structure associated with the second data structure;

distributing to the media processing unit the second data structure and the third data structure associated with the requested segment instance, the third data structure storing the replacement segment instance; and identifying a particular segment of the plurality of segments requiring replacement of one segment instance with another segment instance of the particular segment sharing a common encoding identifier, wherein the second data structure associated with the non-requested segment instance is usable by the media processing unit in conjunction with the first and third data structures to request distribution of the non-requested segment instance for replacement of the requested segment instance during presentation of the respective different digital media content of the segments in the sequence by the media processing unit, wherein using the first data structure includes accessing the first data structure from storage, wherein the replacement is performed by forming a valid file by concatenating together and interchanging the replacement segments at distribution or playback at the media processing unit without being connected to a server.

13. The method according to claim 12, wherein:

the second data structure comprises a movie fragment box specified by the base media file format established by the International Organization for Standardization ("ISO"); and the third data structure comprises a movie data box specified by the base media file format established by the ISO.

14. The method according to claim 12, wherein the media processing unit is selected from the group comprising: a server-side media processing unit and a client-side media processing unit.

15. The method according to claim 12, wherein the first and second sets of encoding characteristics are selected from the group comprising: media data sizes; compression ratios; encoding rates; encoding formats; encryption formats; media data presentation rates; media data source identities; and media data source locations.

16. The method according to claim 12, wherein the first and second instance identifiers are selected from the group comprising: vectors, pointers, and URLs.

17. The method according to claim 12, wherein the first data structure stores a reference to a map of instance identifiers and locations thereof.

18. The method according to claim 12, wherein the media data content is selected from the group comprising: audio data; video data; image data; graphics data; text data; and combinations thereof, and wherein the predetermined amount of media data represented by each of the plurality of segments is selected based on criteria from the group comprising: time-based criteria; and quantity-based criteria; and combinations thereof.

19. A media processor for presenting or storing, or both, at least one sequence of digital media content, wherein each sequence is arranged in accordance with a predetermined file format and comprises a plurality of segments for sequential presentation by the digital media presentation unit, each segment including a respective different predetermined amount of the digital media content, the unit comprising:

a processor responsive to computer program, wherein the computer program, when loaded into the processor, is operable to perform a method comprising:

arranging for sequential presentation of the segments in the sequence, wherein each of the plural segments to be presented comprise at least a first segment instance created by encoding the digital media content of a segment based on a first set of encoding characteristics and a second segment instance created by encoding the digital media content of the segment based on a second set of encoding characteristics different from the first set of encoding characteristics, wherein the segments are independently distributable and storable, each sequence having a sequence ID associated therewith, each segment having a segment ID associated therewith and each segment instance having an instance ID associated therewith;

identifying a particular segment requiring replacement of one segment instance with another segment instance sharing a common encoding ID based on predetermined instance selection criteria applied by the media processing unit, wherein the media processing unit uses a plurality of data structures to dynamically select for presentation the replacement segment instance based on the instance selection criteria while presenting or storing the respective digital media content of the plurality of segments in the sequence, wherein the replacement is performed by forming a valid file by concatenating together and interchanging the replacement segments at distribution, playback or storage at the media processing unit without being connected to a server, a first of the data structures including a map of the instance IDs, and a logical arrangement of the segments IDs to the instance IDs, a second of the data structures storing a replacement instance ID associated with a replacement segment instance requested by the media processing unit and a third of the data structures storing the replacement segment instance.

20. The media processing unit according to claim 19, wherein the media processing unit comprises a client-side device or a server-side device.

\* \* \* \* \*